United States Patent [19]

Brummitt

[11] 3,908,846

[45] Sept. 30, 1975

[54] BALE HANDLING APPARATUS

[76] Inventor: Roger Brummitt, Rt. 1, Pollock, Mo. 63560

[22] Filed: Feb. 4, 1974

[21] Appl. No.: 439,557

[52] U.S. Cl........... 214/147 G; 214/653; 242/86.5 R
[51] Int. Cl.²........................................... B66C 1/44
[58] Field of Search............ 214/653, 147 R, 147 G; 294/DIG. 2; 242/86.5 R, 86.7

[56] References Cited
UNITED STATES PATENTS

| | | | |
|---|---|---|---|
| 1,364,383 | 1/1921 | King | 214/653 QB X |
| 1,437,547 | 12/1922 | Pope | 214/147 G |
| 2,706,570 | 4/1955 | Jewell et al. | 214/653 |
| 2,954,886 | 10/1960 | Nelson | 214/147 G X |
| 3,048,348 | 8/1962 | Griffin | 242/86.5 |
| 3,587,218 | 6/1971 | Geary | 56/343 |
| 3,677,428 | 7/1972 | Mallett | 214/147 G |

*Primary Examiner*—Frank E. Werner
*Attorney, Agent, or Firm*—Fishburn, Gold & Litman

[57] ABSTRACT

A large round bale handling apparatus for mounting on a farm tractor and including a frame structure having a pair of spaced apart arms pivotally mounted thereon with elongate bale penetrating members rotatably mounted adjacent free ends of said arms, said penetrating members being adapted to be inserted into opposite ends of a bale of hay or the like. A power actuated device is operably connected to the arms to swing same towards and away from one another to grasp and release a bale from between the arms. The apparatus is raised and lowered to position a bale secured between the arms and forward movement of the tractor will unwind the bale when same is in engagement with the ground.

5 Claims, 6 Drawing Figures

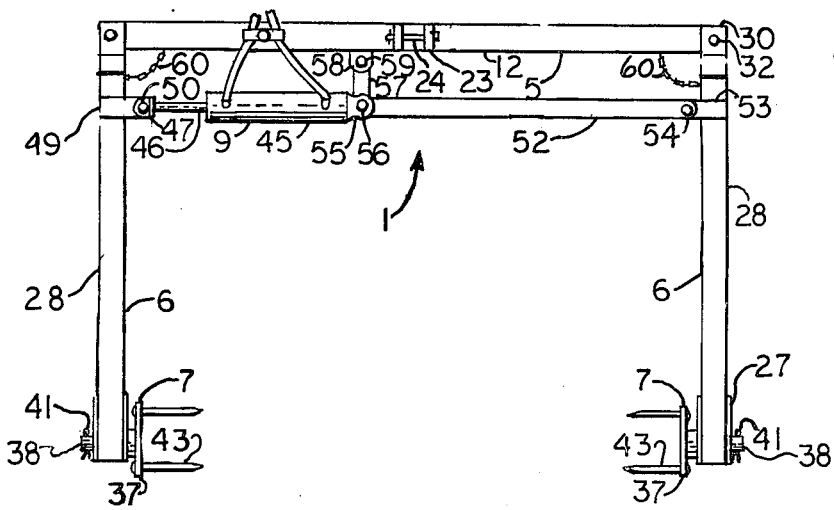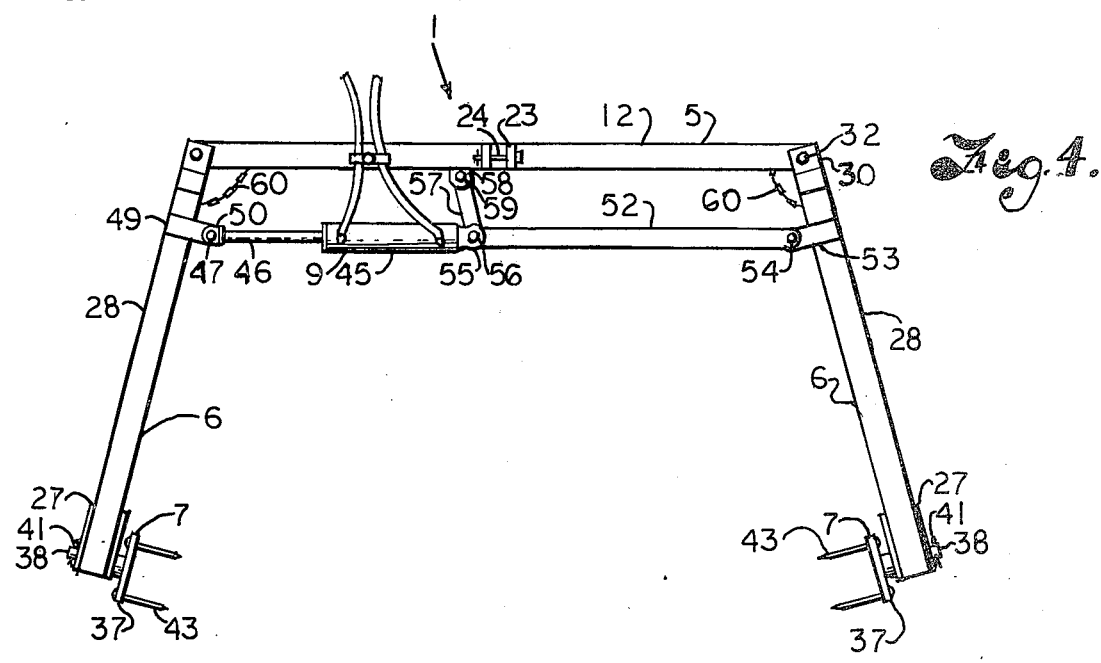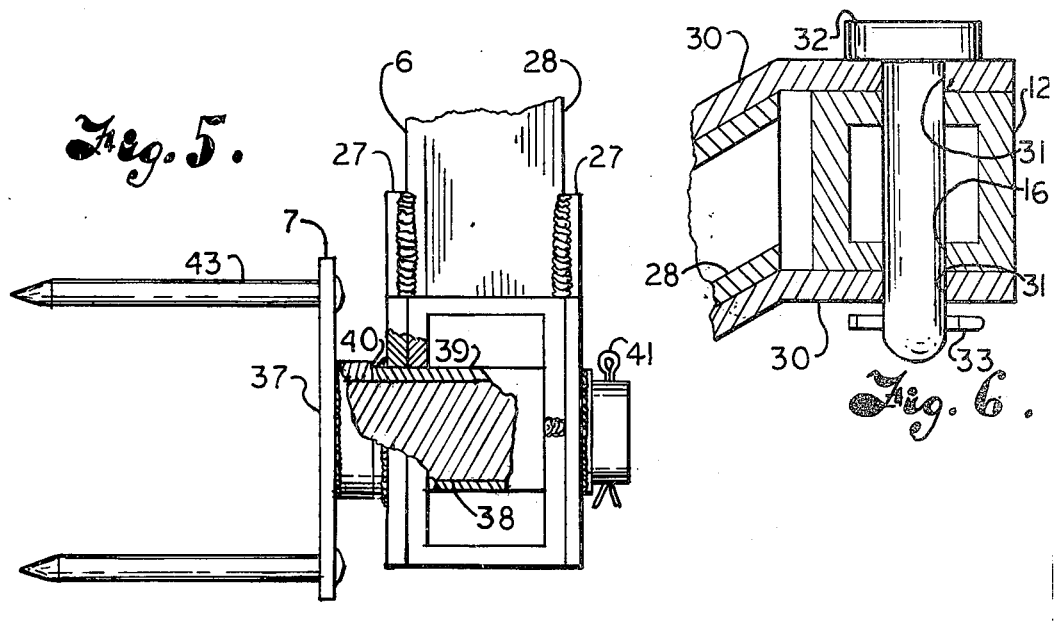

3,908,846

1

BALE HANDLING APPARATUS

In recent years baling of hay and the like has included the use of large bales having the hay generally in a strip wound in a spiral convolution, the bales being approximately six feet in diameter and four to six feet long and of substantial weight. Such bales have certain advantages over smaller bales but have been difficult to handle in moving same about a field and delivering same to a storage or feeding area. Because of the large size and weight of the large bales, conventional bale handling equipment was inadequate to properly and safely handle such large bales.

The principal objects of the present invention are: to provide a bale handling apparatus which is adapted to be mounted on a farm tractor for grasping a large bale to move same; to provide such an apparatus that can be secured to a conventional three-point hitch for elevationally positioning the apparatus and the bale; to provide such an apparatus with a pair of pivotally mounted arms and power actuated means to move same towards and away from one another for selectively grasping a bale therebetween and releasing same; to provide such an apparatus with bale engaging means which includes a plurality of bale penetrating members positioned on each end of the bale with the bale penetrating members being spaced apart for securely engaging the bale and with the bale penetrating members being elongate to support the weight of the bale; to provide such an apparatus which is operable for elevationally positioning the bale and transporting same to a feeding location and then lowering the bale into engagement with the ground with the bale being rotatable to unwind the hay and dispense same on the ground for feeding; and to provide such an apparatus that is well adapted for its intended use, economical to manufacture, easy to maintain, and positive in operation.

Other objects and advantages of the present invention will become apparent from the following description taken in connection with the accompanying drawings wherein are set forth by way of illustration and example, certain embodiments of the present invention.

FIG. 3 is a plan view of the bale handling apparatus showing the arms thereof in a closed or retracted position.

FIG. 4 is a plan view of the bale handling apparatus showing the arms thereof in an open position.

FIG. 5 is an enlarged fragmentary view of the end of the arms with portions broken away to show structural details of bale engaging means.

FIG. 6 is an enlarged fragmentary view of an end of one arm and one frame member with portions broken away to show structural details of the pivotal mounting.

Figure 1:
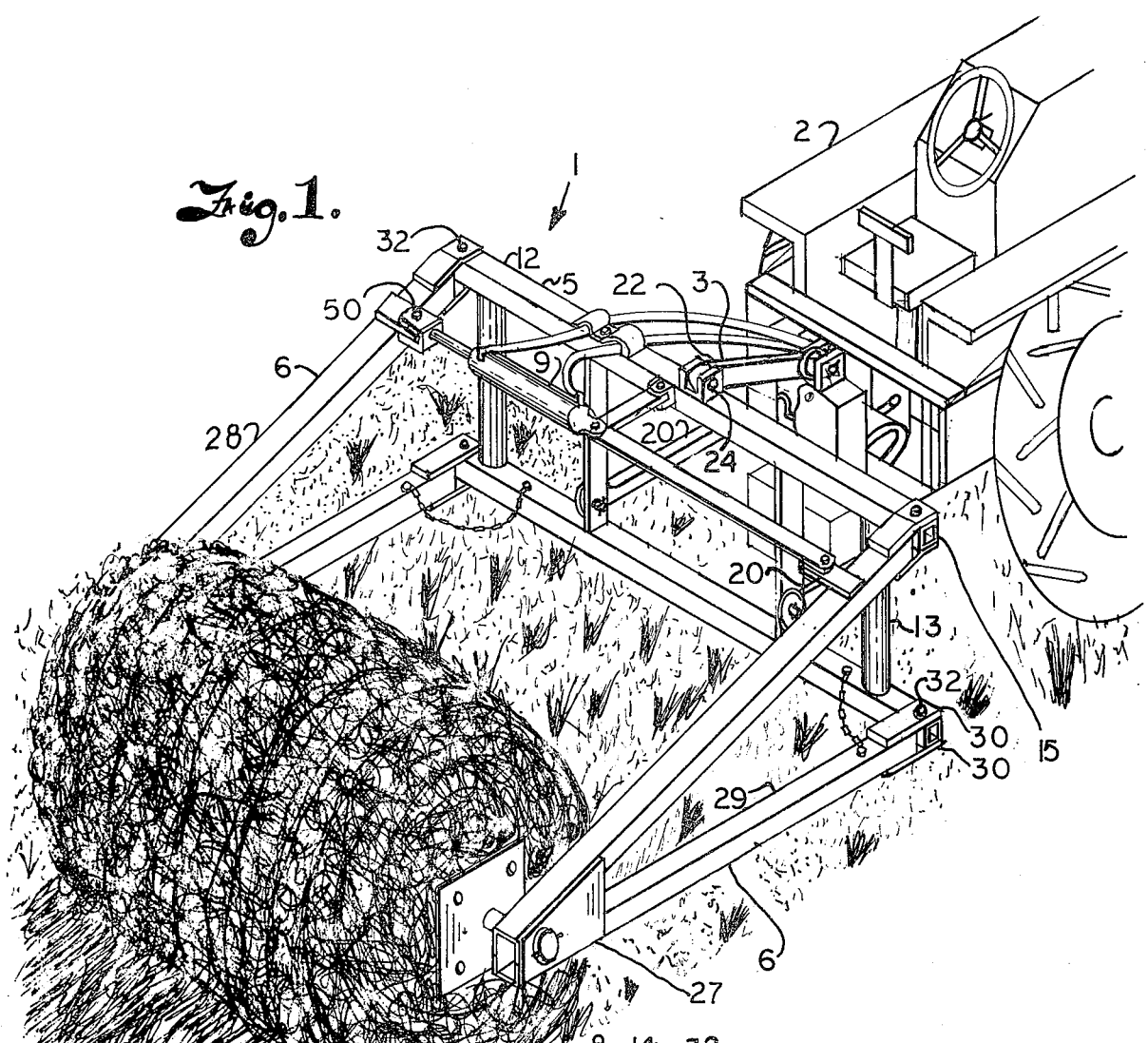
FIG. 1 is a perspective view of a bale handling apparatus mounted on a tractor and having a bale of hay secured between arms of the apparatus.
Figure 2:
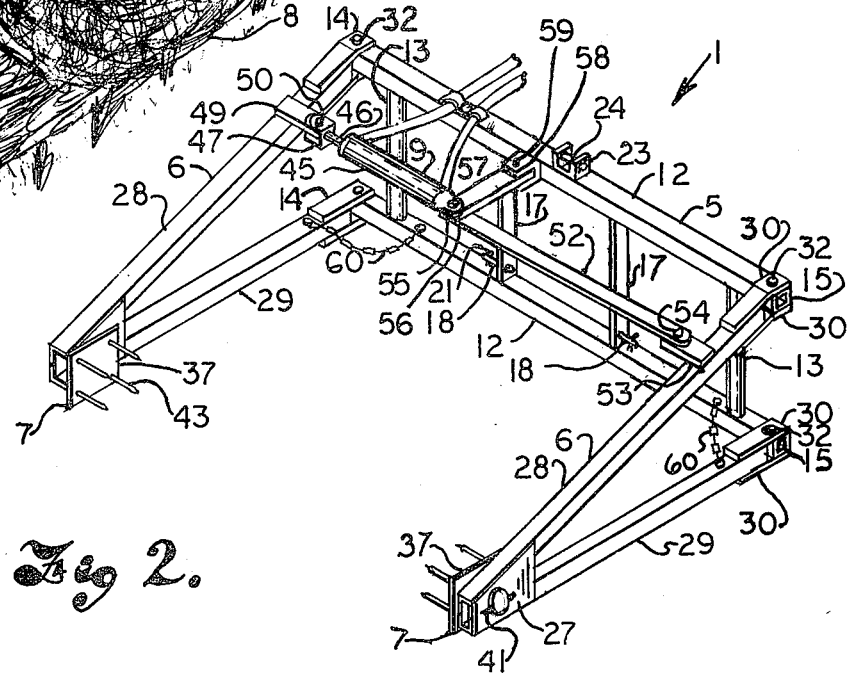
FIG. 2 is a perspective view of the bale handling apparatus.

Referring more in detail to the drawings

As required, detailed embodiments of the present invention are disclosed herein however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

The reference numeral 1 designates generally a bale handling apparatus adapted for mounting on a conventional tractor 2 to be carried by a conventional hitch 3 with the apparatus 1 being adapted to handle large round bales of hay, and the like. The apparatus 1 includes a frame structure 5 suitably connected to the implement hitch 3 and having a pair of spaced apart arms 6 pivotally mounted thereon with the arms 6 swingable toward and away from one another and having suitable bale engaging means 7 adjacent free ends thereof to engage opposite ends of a bale 8 when the arms 6 swing toward one another. Suitable power actuated means 9 is connected to the arms 6 and is operable to effect the movement of the arms toward and away from one another.

The frame structure 5 may be of any suitable type and as illustrated, it includes a pair of horizontally disposed spaced apart frame members 12 having a plurality of vertically disposed frame members 13 extending therebetween and secured thereto and spaced inwardly from opposed ends 14 and 15 of the frame members 12 forming a rigid and generally rectangularly shaped frame structure 5. Preferably, the frame members 12 and 13 are hollow or tubular for strength with lightness in weight, said frame members 12 being illustrated as rectangular tubing. The rectangular shape of the horizontal frame members 12 facilitates manufacture of the frame 5 by providing substantially flat surfaces for securing the vertical frame members 13 thereto. The horizontal frame members 12 each have bearing means or holes 16 therethrough adjacent to the ends 14 and 15 and outwardly of the frame members 13 for a purpose later described. A pair of spaced apart and vertical frame members 17 which are illustrated as elongated plates extend between and are secured to the horizontal frame members 12 between the frame members 13. The frame structure 5 is provided with means for connecting same to the implement hitch 3 and as shown each of the frame members 17 have a pin 18 secured thereto and extending therefrom in a generally horizontal direction. The pins 18 are positioned adjacent to the lower frame member 12 and are operable to extend through bearings in the ends of two arms 20 of the implement hitch 3 with the arms 20 being the lower disposed arms of the implement hitch which is illustrated as a three point hitch which is operable to swing the hitch arms up and down to raise and lower implements mounted thereon in a conventional manner. Keepers 21 are provided for the pins 18 and retain the arms 20 thereon. The third arm 22 of the three point implement hitch 3 in the illustrated structure, is pivotally secured to the upper disposed frame member 12 in any suitable manner and as shown a U-shaped bracket 23 is secured to the upper disposed frame member 12 such as by welding, and receives therein the arm 22 having a pin 24 extending through a bearing in the arm 22 adjacent the end thereof and holes (not shown) through the bracket 23. Suitable keeper means are provided for the pin 24 to retain same through the bracket 23 and arm 22. It is to be noted that the implement hitch 3 is of generally standard construction with the arms 20 and 22 being spaced apart and with the arm 22 being disposed vertically above the arms 20 thereby preventing rotation of the frame structure 5 relative to the implement hitch 3.

The arms 6 are a pair and are of substantially the same construction. As illustrated the arms are elongate and are comprised of a pair of elongate frame members 28 and 29 having an end of each secured together by a gusset plate member 27 secured to each of opposed sides of the frame members 28 and 29 with same diverging from the gussets 30 forming an A-shaped arm. Each of the frame members 28 and 29 have a free end positioned adjacent to a respective frame member 12. A yoke type mount is provided for each of the ends of the frame members 28 and 29 for swingably mounting the arms to the frame structure 5. Preferably the frame members 28 and 29 are hollow or tubular and are transversely rectangular in shape and opposed sides thereof each have a plate 30 secured thereto. A hole 31 is provided through each of the plates 30 in axial alignment and are aligned with the holes 16 through the ends of the frame members 12. Pivot pins 32 extend through the aligned holes 16 and 31 for pivotally or swingably mounting the arms 6 on the frame structure 5. Keeper means 33, such as cotter pins can be provided on each of the pivot pins 32 to retain same within the holes 16 and 31. The pivotal mounting of the arms allows a free end of same to move forward and away from one another in a generally horizontal plane.

The use of tubular or hollow members in the frame structure 5 and the arms 6 provides a rigid and lightweight structure.

The apparatus 1 is provided with bale engaging means 7 which are adapted to engage opposite ends of the bale 8 and support same between the arms 6 when same are in a closed position with the bale engaging means being rotatable to allow free rotation of the bale 8. In this regard each arm 6 is provided with a bale engaging means 7 which in the illustrated structure includes a plate member 37 freely rotatably mounted on the arms 6 so as to face one another and are positioned adjacent the free ends thereof in any suitable manner. As shown, a shaft 38 is secured to the plates 37 as by welding, with the shafts 38 each being receivable through a respective bushing bearing 39 which is fixed in the arms 6. The bearings 39 on each arm are substantially coaxial when the arms 6 are in their closed position. A shoulder 40 is provided on the shafts 38 to space the plates 37 from the arms 27 and keepers 41 such as cotter pins are provided on the shafts 38 to retain same within the bearings 39. The keepers 41 are positioned on the outer disposed side of the arms 6 with the shafts 38 each extending through the bearings 39. Each of the plates 37 is provided with a plurality of elongate bale penetrating members or tines 43 each suitably secured to a respective plate 37, and extending therefrom generally toward the opposite arm 6. The tines 43 are spaced apart and located about the center of rotation of the plates 37 and as illustrated four tines 43 are provided on each of the plates 37. The use of a plurality of tines 43 prevents relative rotation and movement between the plates 37 and the bale 6 when same is suspended therebetween. The tines 43 are of suitable length to extend into the bale and support the weight of the bale 8.

The apparatus 1 is provided with suitable power means 9 which is operable to selectively move the arms 6 away from and toward one another. In the illustrated structure a hydraulic ram 45 is preferably connected to the hydraulic system of the tractor 2 for operation thereof and has operable connection to both of the arms 6 and upon extension and retraction of the ram 45 the arms 6 swing away from one another and towards one another respectively. As shown, the ram 45 is suitably mounted between the arms 6 and connected to same. The movable rod 46 of the ram 45 is pivotally connected to one of the arms 6 such as by having a U-shaped connector 47 secured to the free end of the rod receiving therein a portion of a plate 49 which is suitably secured to the one arm 6. Holes (not shown) extend through the plate 49 and connector 47 and are aligned receiving therethrough a pin 50 for pivotally mounting the ram 45 on the one arm 6. A link 52 has one end pivotally mounted on the other arm 6 and the other end pivotally mounted on the ram 45. As illustrated a plate 53 is secured to the other arm 6 and a pin 54 extends through aligned holes (not shown) through the plate 53 and the one end of the link 52 providing the pivotal mounting. Preferably the ram 45 has a U-shaped bracket 55 on one end thereof and receives the other end of the link 52 therein with each having aligned holes (not shown) therethrough receiving a pin 56 therethrough for pivotally connecting the ram 45 and the link 52. Means are provided for retaining the ram 45 and link 52 substantially in alignment. A link or support arm 57 is pivotally mounted on a U-shaped bracket 58 which is secured to the upper disposed frame member 12 with one end of the link 57 and the bracket 58 having alignable holes receiving a pin 59 therethrough for the pivotal mounting. The other end of the link 57 is pivotally mounted on the ram 45 such as by having the link 57 received in bracket 55 and having the pin 56 extend through a hole through the link 57. The link 57 also provides support for the ram 45. Preferably the ram 45 is hydraulically operated and in this regard it is connected to the hydraulic system of the tractor. Upon extension of the ram 45 the arms 6 swing away from one another and upon retraction of the ram 45 the arms 6 swing toward one another.

In order that movement of both arms is effected the apparatus 1 is provided with means to limit outward swinging movement of each arm, suitable stops or restraints are connected to the arms and frame and in the illustrated structure a pair of chain members 60 each have one end thereof secured to the frame structure 5 and the other end thereof secured to a respective arm 6 with the length of the chains 60 being pre-determined and limiting the outward swinging movement of the arms 6 to a desired spacing between the inner ends of the tines. Should the ram 45 move only one of the arms 6 initially, upon reaching the extended length and respective chain 60, the arm would cease movement and further extension of the ram 45 would cause the other arm 6 to move until stopped by reaching the extended length of the chains 60.

The present invention is more fully understood by a description of the operation thereof. When it is desired to move a bale of hay 8, the operator of the tractor 2 and the apparatus 1 backs the tractor up to the bale 8 and actuates the ram 45 to extend same and move the arms 6 to an open position. Further backing of the tractor moves the arms 6 on opposite ends of the bale 8 until the bale engaging means 7 are located centrally of the bale 8. The implement hitch 3 can be actuated to elevationally position the bale engaging means 7 until same are positioned in the center of the bale 8 on opposite ends thereof. Retraction of the ram 45 moves the bale engaging means 7 into penetrating engagement with the opposite ends of the bale 8 and urging the tines 43 to penetrate the bale and hold the bale 8 between the arms 6 and the plates 37. The implement hitch 3 can then be actuated to elevate the bale 8 from the ground so as to enable the operator of the tractor to move the bale about to a desired location, such as a feeding lot or feeding area for livestock. Upon reaching the desired location, the implement hitch 3 is lowered thereby lowering the apparatus 1 and the bale 8 until the bale 8 is in engagement with the ground and upon forward movement of the tractor 2, the bale 8 will rotate on the shafts 38 and unwind leaving an elongate strip or layer of hay on the ground to distribute the hay over a large area. Such unwinding is made possible by the fact that the large bales 8 are made by spirally winding hay into a circular bale. For unrolling a bale the operator of the tractor 2 before backing the tractor up to the bale 8, should first determine the direction of spirally wrapping of the bale so that same can be unwound by forward movement of the tractor 2. Upon completion of a distribution of a desired quantity of the hay by unwinding, the strip is cut and the remaining portion of the bale 8 may be moved to a desired place and released from between the arms 6 by extending the ram 45 and retracting the tines 43 from penetrating engagement with the bale 8.

It is to be understood that while I have illustrated and described certain forms of my invention, it is not to be limited to the specific form or arrangement of parts herein described and shown.

What I claim and desire to secure by Letters Patent is:

1. In a bale handling apparatus, a combination of:
   a. a farm tractor with an implement hitch, said hitch being selectively elevationally positionable;
   b. a frame structure;
   c. means securing said frame structure to said hitch with said hitch being operable for elevationally positioning said frame structure;
   d. a pair of arms spaced apart and swingably mounted on said frame structure, said arms each having a free end spaced from said frame structure and selectively movable toward and away from one another upon swinging movement of said arms;
   e. a plurality of elongate bale penetrating members;
   f. means rotatably mounting certain of said bale penetrating members on each of said arms adjacent the free ends thereof, the bale penetrating members on one arm extending generally toward the bale penetrating members on the other said arm;
   g. power means operabaly connected to at least one of said arms for selectively effecting the swinging movement of said arms toward and away from one another with the movement toward one another urging said bale penetrating members into opposite ends of a bale;
   h. said bale penetrating members including elongate tines;
   i. said means rotatably mounting said bale penetrating members including a member freely rotatably mounted on each said arm and having a plurality of said tines on each said member in spaced apart relation and disposed about a center of rotation of the respective said member for preventing relative rotation and slippage between said bale and said members;
   j. means connected to said arms and said frame and limiting the movement of said arms away from one another;
   k. means operably connecting said power means to each of said arms wherein said power means selectively effects swinging movement of both of said arms towards and away from one another;
   l. said power means includes a ram selectively extendable and retractable;
   m. said means operably connecting said power means to said arms including a first link pivotally mounted on said frame and one end of said ram and a second link pivotally mounted on the other said arm whereby extension and retraction of said arm effects swinging movement of said arms;
   n. said frame structure having a pair of vertically spaced apart generally horizontal frame members having free ends and a plurality of horizontally spaced apart generally vertical frame members secured to and extending between said horizontal frame members, said arms being pivotally mounted on the horizontal frame members adjacent the free ends thereof;
   o. said hitch being a three point hitch; and
   p. said means for securing said frame to said implement hitch including at least three members secured to said frame in spaced apart relation with at least one of said members being spaced vertically from the remaining said members, each said member having one arm of said hitch pivotally connected thereto.

2. The bale handling apparatus as set forth in claim 1 wherein said means rotatably mounting said bale penetrating members includes:
   a. an elongate cylindrical bearing member fixed in each arm adjacent the free end thereof with the bearings being generally coaxial when said arms are in generally parallel relation;
   b. said members each being in the form of a plate;
   c. a shaft secured to each said plate and being received through a respective said bearing and freely rotatable therein permitting free rotation of said plate;
   d. a keeper engaging a respective said shaft and said bearing and retaining said shafts within the respective said bearings.

3. A bale handling apparatus mountable on an implement hitch of a farm tractor for grasping and selectively elevationally positioning a large bale, said apparatus including:
   a. a frame structure having a pair of vertically spaced apart generally horizontal frame members having opposite free ends and a plurality of horizontally spaced apart generally vertical frame members secured to and extending between said horizontal frame members;
   b. securing means on said frame adapted for securing same to an implement hitch of a farm tractor;
   c. a pair of arms spaced apart and swingably mounted on said frame structure, said arms each having a free end spaced from said frame structure and having elongate arm members connected together adjacent the respective free end and diverging therefrom and terminating in vertically spaced end portions;
   d. means pivotally mounting said spaced arm end portions to said free ends of the horizontal frame members for selectively swinging said arms and movement of the free ends toward and away from one another between closed and open positions;

e. a member freely rotatably mounted on each said arm adjacent the free end thereof with the member on one arm generally facing the member on the other said arm when said arms are in a substantially closed position;

f. at least one elongate bale penetrating member on each said rotatably mounted member with the bale penetrating member on one rotatably mounted member extending generally toward the bale penetrating member on the other said rotatably mounted member when said arms are in a substantially closed position;

f. selectively extendable and retractable ram means operably connected to said arms for selectively effecting the movement of said arms toward and away from one another with the movement toward one another for urging said bale penetrating members into penetrating engagement with opposite ends of a bale.

4. The bale handling apparatus as set forth in claim 3 wherein:

a. said members each having a plurality of said bale penetrating members in spaced apart relation with at least one of said penetrating members on each said member being spaced from a center of rotation of a respective said member preventing relative rotation and slippage between said bale and said members.

5. The bale handling apparatus as set forth in claim 4 including:

a. elongate flexible means having opposed ends operably connected to said frame and said arms and limiting the respective opening movement of each of said arms away from one another;

b. said ram means having opposed ends with one end pivotally connected to one arm;

c. a first link pivotally connected to the other end of said ram and to the other arm;

d. a second link having one end pivotally connected to the frame and another end pivotally connected to said other end of said ram.

* * * * *